US012010283B2

(12) United States Patent
Yano

(10) Patent No.: US 12,010,283 B2
(45) Date of Patent: Jun. 11, 2024

(54) INFORMATION PROCESSING APPARATUS, IMAGE PROCESSING APPARATUS AND CONTROL METHOD THEREOF

(71) Applicant: CANON KABUSHIKI KAISHA, Tokyo (JP)

(72) Inventor: Shodai Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/552,316

(22) Filed: Dec. 15, 2021

(65) Prior Publication Data

US 2022/0201151 A1      Jun. 23, 2022

(30) Foreign Application Priority Data

Dec. 22, 2020  (JP) ................................ 2020-212150

(51) Int. Cl.
| | | |
|---|---|---|
| *H04N 1/00* | (2006.01) | |
| *H04L 51/18* | (2022.01) | |
| *H04N 1/32* | (2006.01) | |
| *H04N 1/44* | (2006.01) | |

(52) U.S. Cl.
CPC ......... *H04N 1/32101* (2013.01); *H04L 51/18* (2013.01); *H04N 1/00212* (2013.01); *H04N 1/4406* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0244615 A1* | 10/2009 | Mizumukai | ............ | H04N 1/444 358/1.15 |
| 2012/0047213 A1* | 2/2012 | Hanada | ............... | H04N 1/32117 709/206 |
| 2014/0118769 A1* | 5/2014 | Adachi | ................. | G06F 3/1211 358/1.13 |
| 2014/0229550 A1* | 8/2014 | Tredoux | ................. | H04L 51/08 709/206 |
| 2014/0376045 A1* | 12/2014 | Oyoshi | ............. | H04N 1/00307 358/1.15 |
| 2017/0171402 A1* | 6/2017 | Yamaguchi | ............. | H04L 51/48 |

(Continued)

FOREIGN PATENT DOCUMENTS

| | | | | | |
|---|---|---|---|---|---|
| JP | 2001265699 | * | 9/2001 | ............... | H04N 1/00 |
| JP | 2002108767 | * | 4/2002 | ............... | H04N 1/00 |
| JP | 2002288086 | * | 10/2002 | ............... | H04N 1/00 |

(Continued)

*Primary Examiner* — Beniyam Menberu
(74) *Attorney, Agent, or Firm* — Canon U.S.A., Inc. IP Division

(57) ABSTRACT

An image processing apparatus is connected to an information processing apparatus via a network. The image processing apparatus includes a reception unit configured to receive, from the information processing apparatus, sending information including at least any of a sending destination, a sending source, and a reply destination of an email, and a job relating to sending of the email using the sending information, a setting unit configured to set the sending information received by the reception unit for at least any of the sending destination, the sending source, and the reply destination, and a sending unit configured to create and send the email using the sending information.

6 Claims, 16 Drawing Sheets

(56) References Cited

U.S. PATENT DOCUMENTS

2019/0327379 A1* 10/2019 Kim ................ G06F 3/1238

FOREIGN PATENT DOCUMENTS

| JP | 2003288307 | * | 10/2003 | ............... H04N 1/00 |
| JP | 2004088611 | * | 3/2004 | ............... H04N 1/00 |
| JP | 2005012251 | * | 1/2005 | ............... H04N 1/00 |
| JP | 2007122091 | * | 5/2007 | ............ G06F 13/00 |
| JP | 3939627 | * | 7/2007 | ............... H04N 1/00 |
| JP | 2009010589 | * | 1/2009 | ............... H04M 1/00 |
| JP | 2015226180 | * | 12/2015 | ............... G06F 3/12 |
| JP | 2017108338 | * | 6/2017 | ............... H04N 1/00 |
| JP | 2017112407 A | | 6/2017 | |
| JP | 2019208179 | * | 12/2019 | ............... H04N 1/00 |
| KR | 20060124282 | * | 12/2006 | ............ H04L 51/48 |

* cited by examiner

INFORMATION PROCESSING APPARATUS, IMAGE PROCESSING APPARATUS AND CONTROL METHOD THEREOF

BACKGROUND

Field of the Disclosure

The present disclosure relates to an information processing apparatus that can perform wireless communication, an image processing apparatus, and a method for reflecting sending information that has been set by the information processing apparatus in a sending source and a reply destination in the image processing apparatus.

Description of the Related Art

In recent years, as a result of the spread of high-performance mobile terminals called smartphones, a scanning function, a printing function, and the like have been provided as an operating system (OS) standard function of the mobile terminals. For example, in the execution of a sending function, a device on a network such as a local area network (LAN) is searched for. An email address of a sending destination and various types of scanning setting information (for example, polychrome or double-sided) set by a user are added to form sending information. The sending information is transmitted to an image processing apparatus having a sending function and that has been found by the search, whereby a mobile terminal can perform a series of processes required for the sending. In this case, network communication between the mobile terminal and the image processing apparatus is established based on a communication protocol such as Transmission Control Protocol/Internet Protocol (TCP/IP), near field communication (NFC), or Bluetooth®, and the network communicate can be achieved by using a known technology.

In a conventional image processing apparatus, an email address that has been set in the image processing apparatus can be designated as a sending source and a reply destination when the email sending function is executed. However, when the image processing apparatus receives the sending information from a data information device such as a mobile terminal, an email address included in the sending information cannot be set as a sending source and a reply destination. In a case where an email address of the image processing apparatus itself is set as a sending source and a reply destination in initial settings of the image processing apparatus, it is difficult for a receiver of an email to know who has sent the email. In addition, there is a possibility of making a reply at an email address that is not intended by the receiver. In order to solve the issues described above, Japanese Patent Application Laid-Open No. 2017-112407 discusses the technique described below. First, when an email sending function is selected in an image processing apparatus, a command to start an address book application is transmitted to a mobile terminal. An address is selected in the mobile terminal that has received the command, and the address is transmitted to the image processing apparatus. In this way, the address selected in the mobile terminal is used in the email sending function on the image processing apparatus.

Japanese Patent Application Laid-Open No. 2017-112407 described above discusses a method for searching an address book of a mobile terminal for an address and setting the address as a sending destination. In this method, both the mobile terminal and an image processing apparatus need to be operated before an email is sent. Therefore, this method has an issue in operability.

SUMMARY

According to embodiments of the present disclosure, an image processing apparatus that is connected to an information processing apparatus via a network, the image processing apparatus includes at least one processor and at least one memory coupled to the at least one processor and storing instructions, which when executed by the at least one processor, cause the at least one processor and the at least one memory to act as a reception unit configured to receive sending information and job information from the information processing apparatus, the sending information including at least any of a sending source and a reply destination of an email, the job information relating to sending of the email using the sending information, and a sending unit configured to create and send the email in accordance with the job information, the at least any of the sending source and the reply destination included in the sending information received by the reception unit being set in the email.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

Components described in these exemplary embodiments are merely examples, and the scope of the present disclosure is not limited to these components.

1. Entire Configuration of Information Processing System

Figure 1:
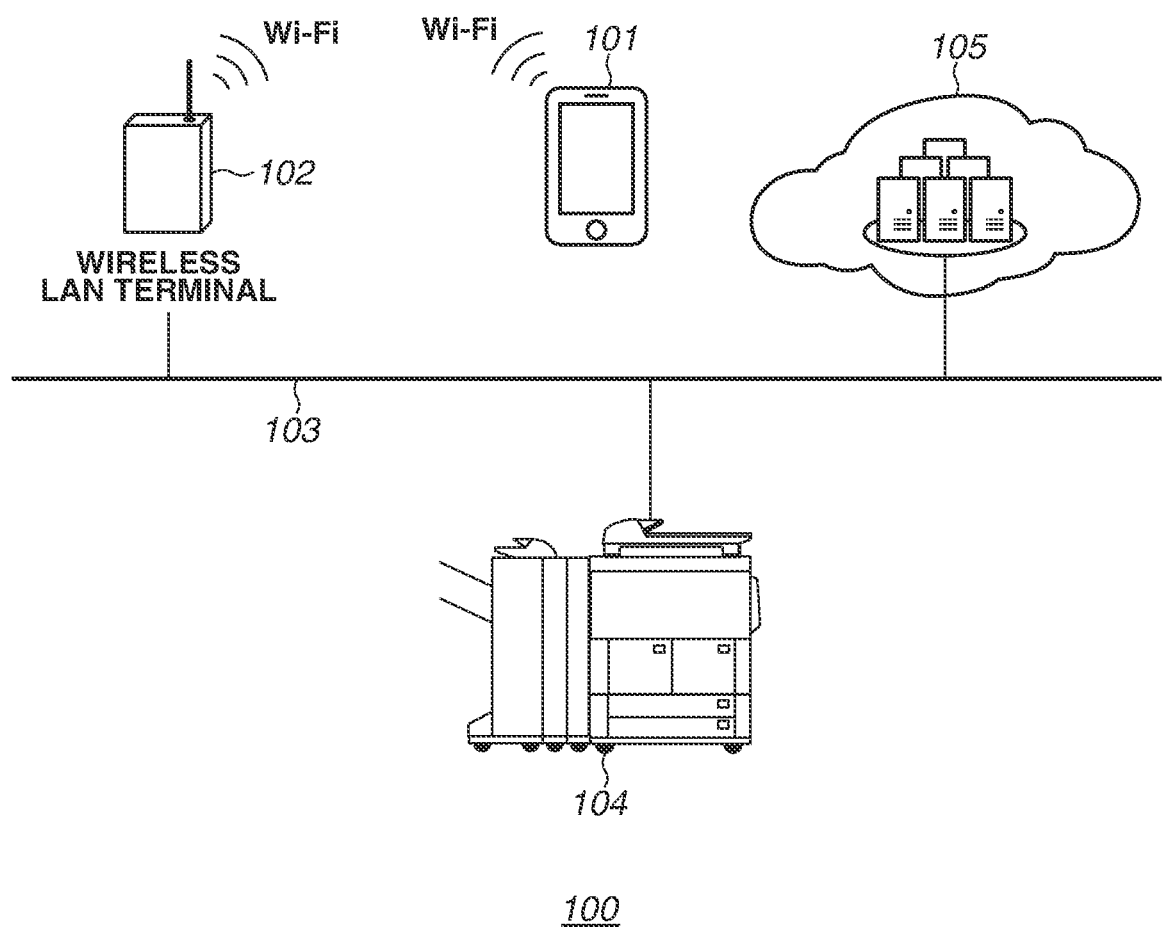
FIG. 1 is a block diagram illustrating a configuration of an information processing system.

FIG. 1 is a block diagram illustrating an entire configuration of an information processing system according to a first exemplary embodiment.

An information processing system 100 includes an information processing apparatus 101, a wireless local area network (LAN) terminal 102, an image processing apparatus 104, and a cloud server 105. The information processing apparatus 101, the wireless LAN terminal 102, the image processing apparatus 104, and the cloud server 105 are connected to each other via Wireless Fidelity (Wi-Fi) and a network 103.

The information processing apparatus 101 is a mobile terminal such as a smartphone, and an operating system for a small-sized terminal or a program that controls phone calls or data communication may operate. Alternatively, the information processing apparatus 101 may be a personal computer that does not perform audio control, location detection control, portable telephone data communication, or the like. The information processing apparatus 101 is connected to the network 103 by using the wireless LAN terminal 102.

The wireless LAN terminal 102 is a master unit of wireless LAN that has a general network router function, and provides wireless LAN via Wi-Fi in home, an office, or the like.

The image processing apparatus 104 is a digital multifunction peripheral (MFP) that has a variety of job execution functions such as a printing function, a copying function, a scanning function, or a facsimile sending function. A user operates the information processing apparatus 101 to issue an instruction to execute a job to the image processing apparatus 104, whereby a variety of functions of the image processing apparatus 104 can be executed.

The cloud server 105 manages data to be used in the information processing apparatus 101 or the image processing apparatus 104, performs processing of expanding a variety of functions, and the like, via the network 103. In the present exemplary embodiment, the image processing apparatus 104 and the cloud server 105 are connected to the network 103 by wire. However, the image processing apparatus 104 and the cloud server 105 may be connected wirelessly by using the wireless LAN terminal 102 similarly to the information processing apparatus 101.

Further, the information processing apparatus 101 and the image processing apparatus 104 can perform short-range wireless communication by using a wireless signal of near field communication (NFC), Bluetooth low energy, or the like. The image processing apparatus 104 holds information (such as an Internet protocol (IP) address or a media access control (MAC) address) for wireless LAN connection with the image processing apparatus 104, in an NFC communication unit or a Bluetooth low energy communication unit described below. The information processing apparatus 101 obtains connection information in short-range wireless communication. Then, communication between the information processing apparatus 101 and the image processing apparatus 104 is started on the basis of the obtained information.

2. Hardware of Information Processing Apparatus

Figure 2:
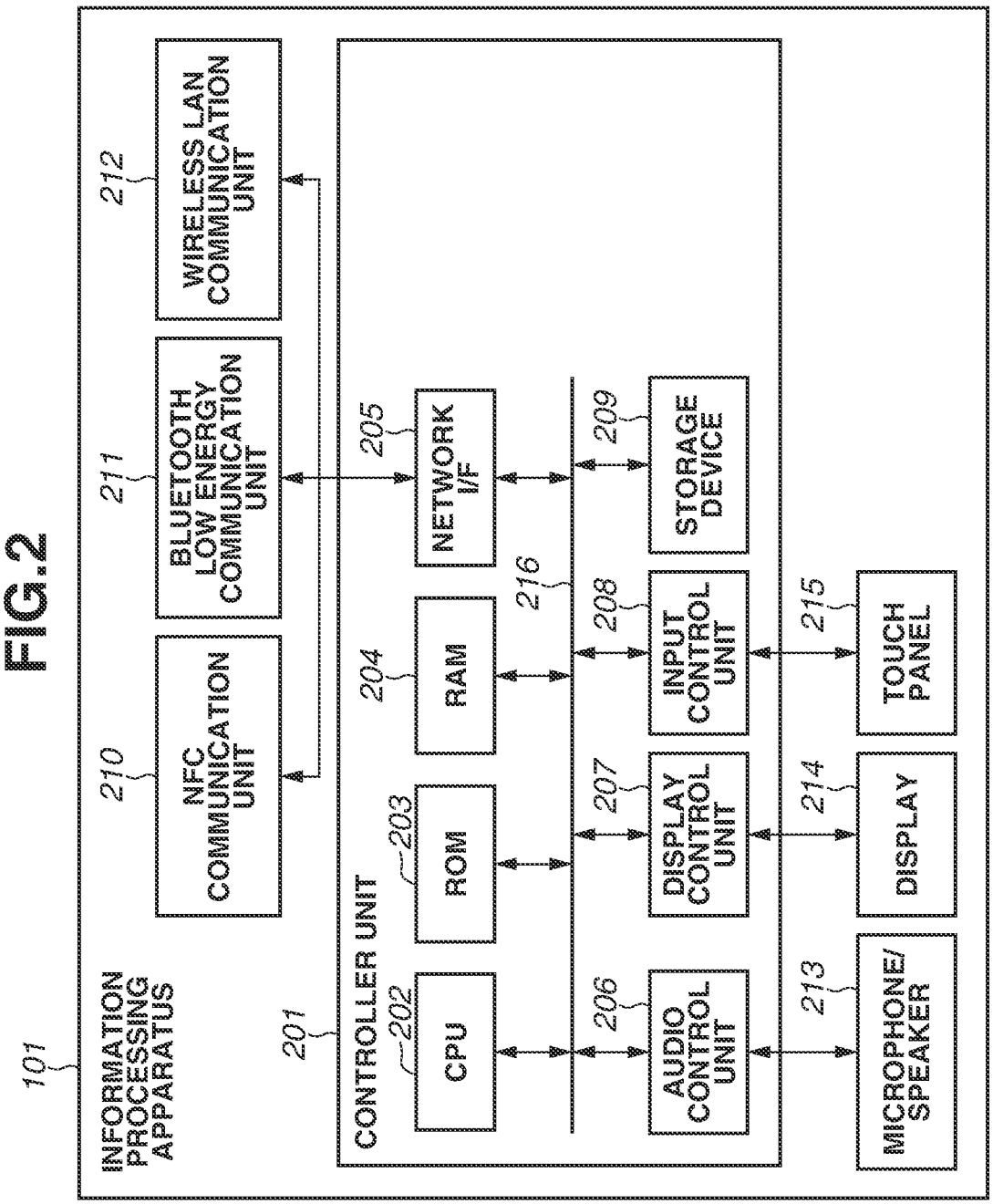
FIG. 2 is a block diagram illustrating a hardware configuration of an information processing apparatus.

FIG. 2 is a block diagram illustrating a hardware configuration of the information processing apparatus 101 according to the present exemplary embodiment.

The information processing apparatus 101 includes a controller unit 201. The controller unit 201 controls a variety of communication units, such as an NFC communication unit 210, a Bluetooth low energy communication unit 211, or a wireless LAN communication unit 212, or a variety of user interface (UI) units, such as a microphone/speaker 213, a display 214, or a touch panel 215.

The controller unit 201 includes a central processing unit (CPU) 202, a read-only memory (ROM) 203, a random access memory (RAM) 204, a network interface (I/F) 205, an audio control unit 206, a display control unit 207, an input control unit 208, and a storage device 209. The CPU 202, the ROM 203, the RAM 204, the network I/F 205, the audio control unit 206, the display control unit 207, the input control unit 208, and the storage device 209 are connected to each other via a system bus 216.

The CPU 202 controls the entirety of a system of the information processing apparatus 101.

The ROM 203 stores an operating system of the information processing apparatus 101 and an application that controls phone calls or data communication, and the CPU 202 executes various programs.

The RAM 204 is a memory used by the CPU 202 to execute the various programs, and is a work memory area where an application executes a program.

The storage device 209 is a nonvolatile storage device. The storage device 209 records various operation mode settings that also need to be held after the reboot of the information processing apparatus 101, an operation log, or the like.

The network I/F 205 is connected to the NFC communication unit 210, the Bluetooth low energy communication unit 211, and the wireless LAN communication unit 212. The network I/F 205 controls various types of wireless communication with the image processing apparatus 104 and the cloud server 105.

The audio control unit 206 controls an input or output of audio data through the microphone/speaker 213.

The display control unit 207 controls an output of image data to be displayed on the display 214.

The input control unit 208 controls an input of information indicated in an instruction a user has issued via a button or the touch panel 215. A variety of applications to be executed in the information processing apparatus 101 is provided to a user, by using the audio control unit 206, the display control unit 207, and the input control unit 208.

3. Hardware of Image Processing Apparatus

Figure 3:
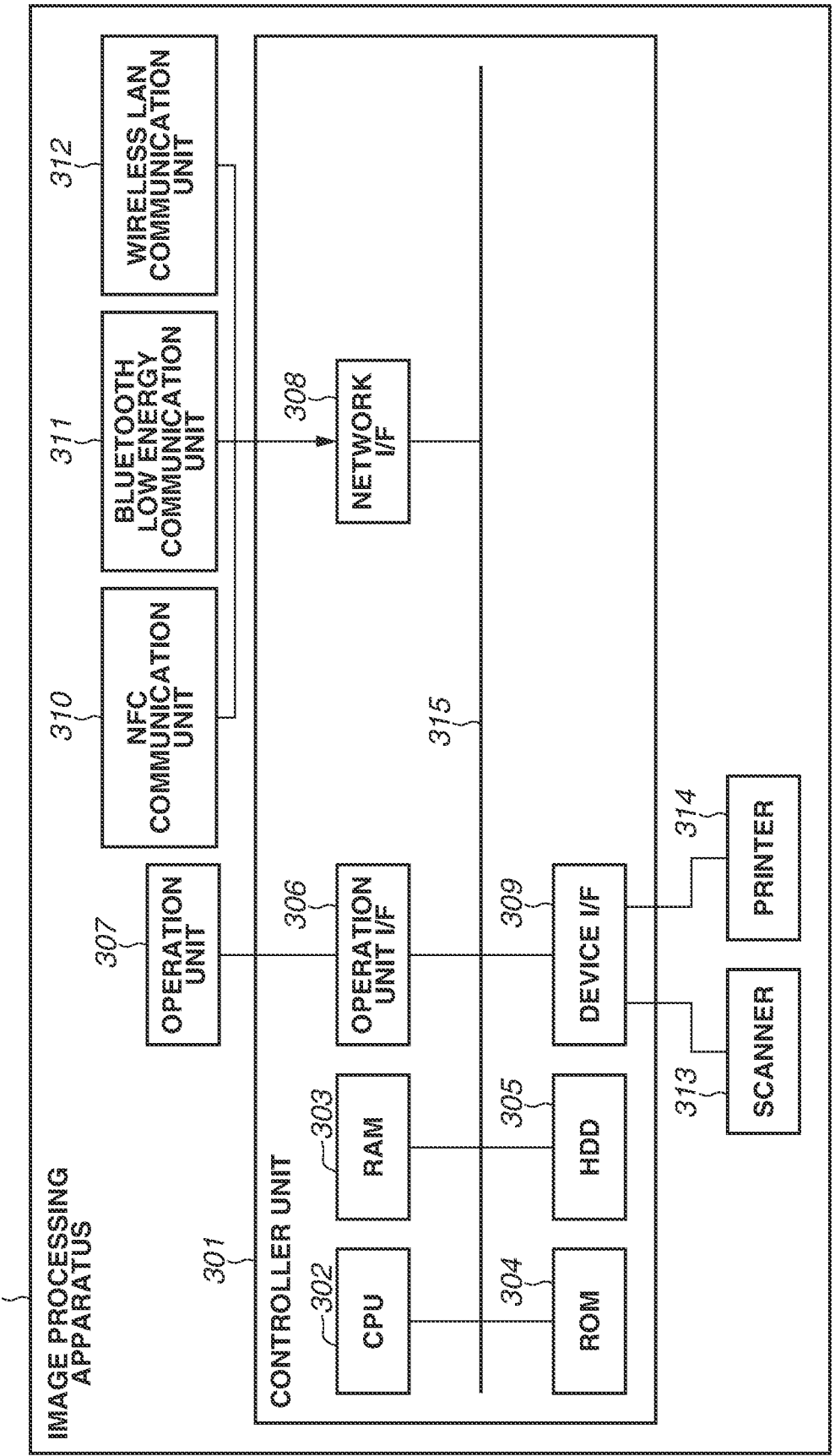
FIG. 3 is a block diagram illustrating a hardware configuration of an image processing apparatus.

FIG. 3 is a block diagram illustrating a hardware configuration of the image processing apparatus 104 according to the present exemplary embodiment.

The image processing apparatus 104 includes a controller unit 301. The controller unit 301 controls a variety of communication units, such as an NFC communication unit 310, a Bluetooth low energy communication unit 311, or a wireless LAN communication unit 312, an operation unit 307, a scanner 313, and a printer 314.

In a case where a user uses a copying function, the controller unit 301 controls the scanner 313 to obtain image data of an original, and controls the printer 314 to print and output an image on paper.

In a case where a user uses a scanning function, the controller unit 301 controls the scanner 313 to obtain image data of an original, convert the image data into code data, and transmit the code data to the information processing apparatus 101, the cloud server 105, or the like via the network 103.

In a case where a user uses a printing function, the controller unit 301 receives image data (code data) from the information processing apparatus 101 or the cloud server 105 through the network 103. Then, the controller unit 301 converts the received print data into image data, and transmits the image data to the printer 314. The printer 314 prints and outputs an image on paper on the basis of the received image data.

In addition, the image processing apparatus 104 has a facsimile (FAX) receiving function for receiving data from Integrated Services Digital Network (ISDN) or the like and printing the data, or a FAX sending function for sending scanned data to ISDN or the like.

An instruction to perform processing of each of these functions is referred to as a job, and the image processing apparatus 104 performs prescribed processing based on a job that corresponds to each of the functions.

The controller unit 301 includes a CPU 302, a RAM 303, a ROM 304, a hard disk drive (HDD) 305, an operation unit I/F 306, a network I/F 308, and a device I/F 309. The CPU 302, the RAM 303, the ROM 304, the HDD 305, the operation unit I/F 306, the network I/F 308, and the device I/F 309 are connected to each other via a system bus 315.

The CPU 302 controls the entirety of a system of the image processing apparatus 104.

The RAM 303 is a system work memory that is used for the CPU 302 to operate, and is an image memory that temporarily stores image data. In the RAM 303, a program, such as an operating system, system software, or application software, or data is also arranged. In addition, scanned image data that has been read by using the scanner 313 is stored, or printed image data that has been received from the information processing apparatus 101 through the network 103 is stored.

The ROM 304 stores a boot program of a system.

The HDD 305 stores an operating system, system software, application software, image data, setting data, or the like.

The operation unit I/F 306 is an interface unit with the operation unit 307. The operation unit I/F 306 outputs, to the operation unit 307, information to be displayed on the operation unit 307. The operation unit I/F 306 also receives, from the operation unit 307, information that has been input by a user.

The network I/F 308 is connected to the NFC communication unit 310, the Bluetooth low energy communication unit 311, and the wireless LAN communication unit 312. The network I/F 308 controls various types of wireless communication with the information processing apparatus 101 or the cloud server 105.

The wireless LAN communication unit 312 forms a wireless LAN with the information processing apparatus 101 via the network 103.

In addition, the NFC communication unit 310 and the Bluetooth low energy communication unit 311 form short-range wireless communication with the information processing apparatus 101 by using a wireless signal. The image processing apparatus 104 transmits or receives job setting information or image data to/from the information processing apparatus 101 via the network I/F 308. The image processing apparatus 104 receives a command to execute each type of function of the image processing apparatus 104, and executes a job.

The device I/F 309 connects the scanner 313 and the printer 314, which read or print image data, to the controller unit 301, and inputs and outputs the image data.

4. Software Configuration of Information Processing Apparatus

Figure 4:
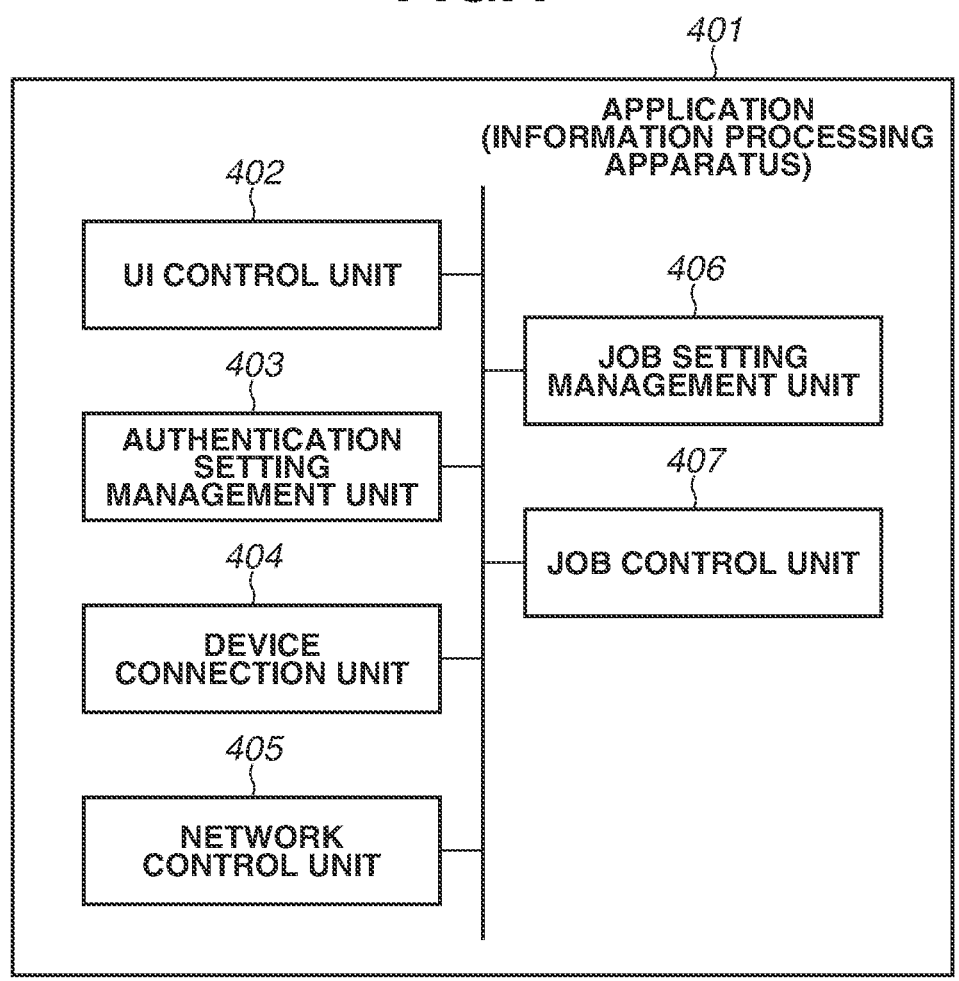
FIG. 4 is a block diagram illustrating a software configuration of the information processing apparatus.

FIG. 4 is a block diagram illustrating a software configuration of the information processing apparatus 101 according to the present exemplary embodiment.

An application 401 is software to be executed by the CPU 202 of the information processing apparatus 101, and the application 401 is stored in the RAM 204.

A UI control unit 402 receives job setting information that a user has input by using the touch panel 215, and transmits the job setting information to a job setting management unit 406 via the input control unit 208. In addition, the UI control unit 402 receives a response from the job setting management unit 406 and a job control unit 407, and outputs the response to the display 214 via the display control unit 207. Further, the UI control unit 402 receives authentication information a user has input by using the touch panel 215, and transmits the authentication information to an authentication setting management unit 403 via the input control unit 208.

The authentication setting management unit 403 transmits the authentication information to a network control unit 405 on the basis of user information received from the UI control unit 402. The authentication information is used via the network 103 in the authentication processing described below performed by the image processing apparatus 104.

A device connection unit 404 establishes short-range wireless communication, such as NFC or Bluetooth low energy, and wireless LAN communication using the network 103, between the information processing apparatus 101 and the image processing apparatus 104. For example, in the case of NFC, a user brings the NFC communication unit 210 of the information processing apparatus 101 close to the NFC communication unit 310 of the image processing apparatus 104, and brings the NFC communication unit 210 into contact with the NFC communication unit 310. Thus, short-range wireless communication is started. In the case of Bluetooth low energy, a user brings the Bluetooth low energy communication unit 211 of the information processing apparatus 101 close to the Bluetooth low energy communication unit 311 of the image processing apparatus 104. In a case where the device connection unit 404 determines that the Bluetooth low energy communication unit 211 and the Bluetooth low energy communication unit 311 are located within a distance in which an intensity of Bluetooth low energy is greater than or equal to a specified intensity, short-range wireless communication is started. As described above, a user performs an operation of bringing NFC or Bluetooth low energy communication units of the information processing apparatus 101 and the image processing apparatus 104 close to each other (referred to as a touch operation), whereby the device connection unit 404 obtains device information of the image processing apparatus 104. Wireless LAN connection with the image processing apparatus 104 via the network 103 is started based on the obtained device information.

The network control unit 405 transmits job setting, a job execution instruction command, image data, user authentication information, or the like to the image processing apparatus 104 via the network 103. Further, the network control unit 405 receives, via the network 103, job setting information stored in the image processing apparatus 104.

The job setting management unit 406 stores, in the RAM 204 or the storage device 209, job setting information input by a user by using the UI control unit 402 and job setting information received from the image processing apparatus 104 and the cloud server 105 by using the network control unit 405. The job setting management unit 406 manages these pieces of job setting information as "preferences" serving as settings that are frequently used by a user. In addition, the job setting management unit 406 manages, as "presettings", custom job setting stored in the RAM 204 or the storage device 209 at the time of installing the application 401.

The job control unit 407 generates job execution instruction information from job setting of "preferences" or "presettings" that have been registered by the job setting management unit 406, and transmits a job execution request to the image processing apparatus 104 via the network 103. The job control unit 407 also obtains a job execution status or an operation state of a device such as the scanner 313 or the printer 314 from the image processing apparatus 104 via the network 103, and transmits the job execution status or the operation state to the UI control unit 402.

5. Software Configuration of Image Processing Apparatus

Figure 5:
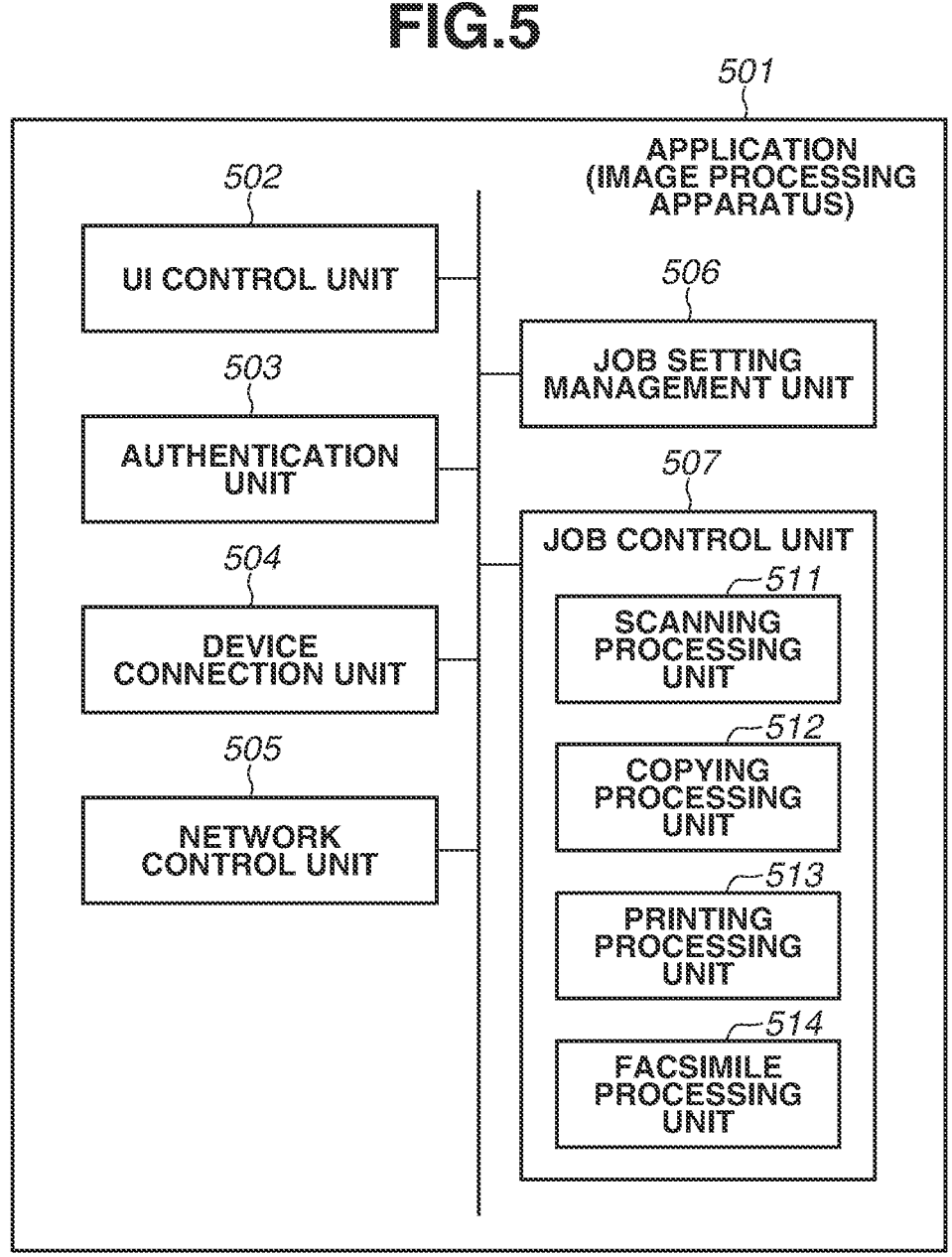
FIG. 5 is a block diagram illustrating a software configuration of the image processing apparatus.

FIG. 5 is a block diagram illustrating a software configuration of the image processing apparatus 104 according to the present exemplary embodiment.

An application 501 is software to be executed by the CPU 302 of the image processing apparatus 104, and the application 501 is stored in the RAM 303.

A UI control unit 502 receives job setting information a user has input by using the operation unit 307, and transmits the job setting information to a job setting management unit 506. The UI control unit 502 also receives a response from the job setting management unit 506 or a job control unit 507, and outputs the response to the operation unit 307.

An authentication unit 503 performs user authentication processing on the basis of authentication information received from the information processing apparatus 101, and transmits a result.

A device connection unit 504 performs handover in short-range wireless communication between the information processing apparatus 101 and the image processing apparatus 104 and establishes wireless LAN communication via the network 103.

A network control unit 505 receives job setting, a job execution instruction command, image data, user authentication information, or the like from the information processing apparatus 101 via the network 103. Further, the network control unit 505 transmits job setting information stored in the image processing apparatus 104, to the information processing apparatus 101 via the network 103.

The job setting management unit 506 stores, in the RAM 303 and the HDD 305, job setting information input by a user by using the UI control unit 502 and job setting information received from the information processing apparatus 101 and the cloud server 105 by using the network control unit 505. The job setting management unit 506 manages these pieces of job setting information as "preferences" serving as settings that are frequently used by a user. In addition, the job setting management unit 506 manages, as "presettings", custom job setting stored in the RAM 303 or the HDD 305 at the time of installing the application 501. Further, the job setting management unit 506 manages, as "history", job setting performed by the image processing apparatus 104.

The job control unit 507 controls each processing unit, such as a scanning processing unit 511, a copying processing unit 512, a printing processing unit 513, or a facsimile processing unit 514, and executes each type of job. The job control unit 507 executes each type of job in accordance with job setting that a user has set by using the operation unit 307, or job setting of "preferences" or "presettings" that have been registered by the job setting management unit 506. Further, the job control unit 507 receives a job execution request from the information processing apparatus 101 via the network 103, and executes each type of job in accordance with the job setting or the job execution request that has been received. The job control unit 507 also transmits a job execution status or an operation state of a device such as the scanner 313 and the printer 314 to the information processing apparatus 101 via the network 103.

6. Screen (Scan and Send) of Information Processing Apparatus (Function Selection Screen)

Function selection of the information processing apparatus 101 will be described with reference to FIG. 6.

The information processing apparatus 101 displays a basic job, preferences, or presettings that will be executed on a function selection screen 601 in the form of a button. Presettings include a Scan and Send button 602 indicating the job "scan and send" for sending a scanned image by email. When the Scan and Send button 602 is pressed, scanning is performed, and a transition is made to a send screen 701. In a basic job button area 603, a plurality of buttons for executing a basic job is arranged. When each of the buttons is pressed, a transition is made to a setting screen for the execution of a job.

(Scan and Send Setting Screen)

Next, setting for scanning and sending in the information processing apparatus 101 will be described with reference to FIGS. 7 and 8.

Figure 7:
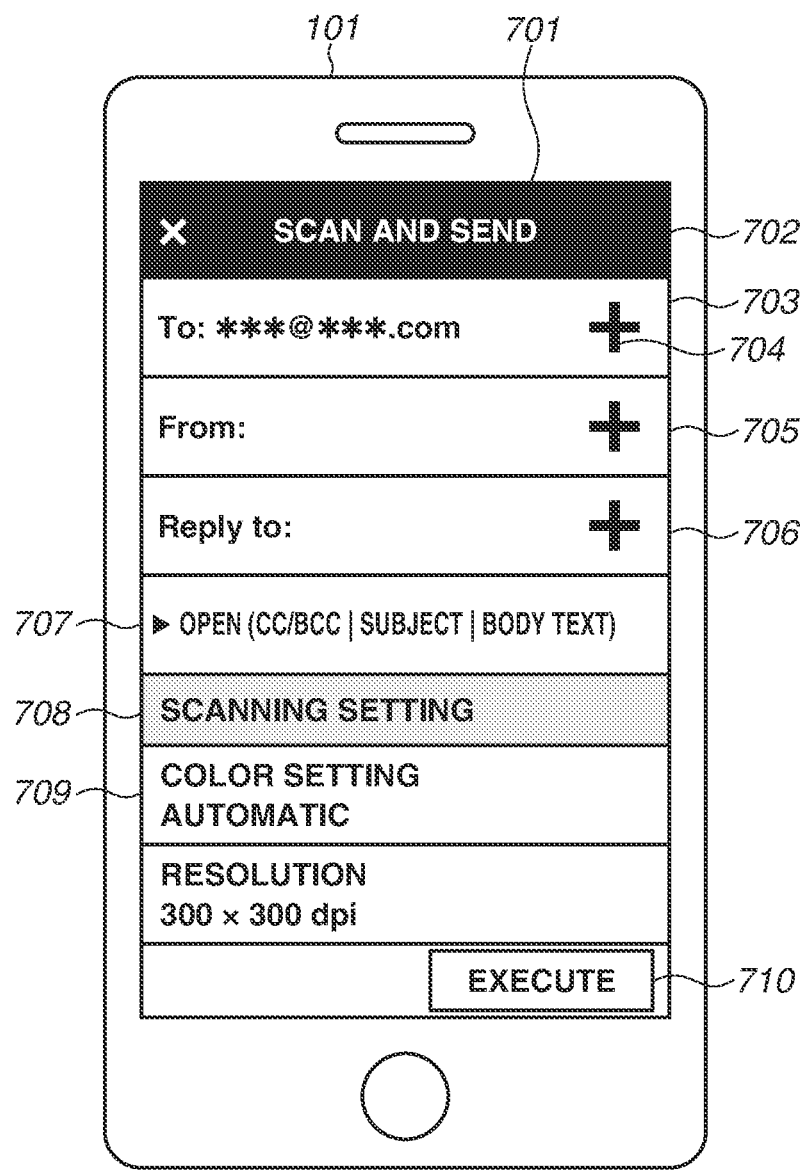
FIG. 7 is a diagram illustrating an example of an email sending setting screen of the information processing apparatus.
Figure 8:
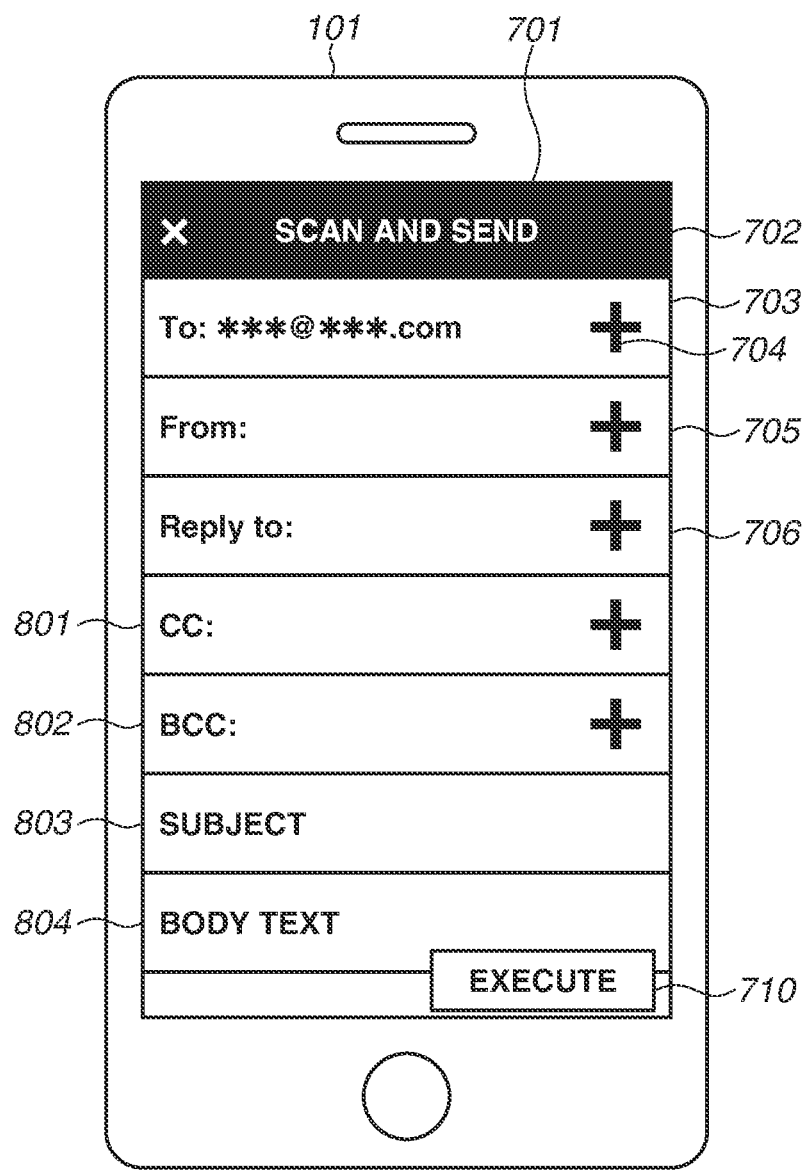
FIG. 8 is a diagram illustrating an example of the email sending setting screen of the information processing apparatus.

On the Scan and Send screen 701 of FIG. 7, setting for sending an email is performed.

A title 702 indicates a title, and a button [×] for cancelling settings and returning to a previous screen is arranged.

In a sending destination setting area 703, an email address of a sending destination can be input by using a software keyboard. When an address book start button 704 [+] is pressed, an address book of the information processing apparatus 101 is started. When a user selects an email address from the address book, the selected email address is displayed in the sending destination setting area 703.

A plurality of email addresses can be set. In a sending source setting area 705 and a reply destination setting area 706, an operation that is similar to an operation performed in the sending destination setting area 703 can be performed to input an email address to which an email will be sent. In a sending source setting area 705 and a reply destination setting area 706, an email address of the information processing apparatus 101 may be set by default. When an Open button 707 is pressed, a display is switched to the screen of FIG. 8, and email setting can be performed. In a carbon copy (CC) input area 801 and a blind carbon copy (BCC) input area 802, an operation that is similar to an operation performed in the sending destination setting area 703 can be performed to input an email address to which an email will be sent. In a subject field 803 for inputting a subject and a body text field 804 for inputting body text, a user can input an arbitrary character string by using the software keyboard of the information processing apparatus 101. Returning to FIG. 7, in a scanning setting area 708, buttons for changing scanning setting that include a color setting button 709 are arranged. When an Execute button 710 is pressed, sending information set above is transmitted to the image processing apparatus 104.

7. Screen (Scan and Send) of Image Processing Apparatus

Figure 9:
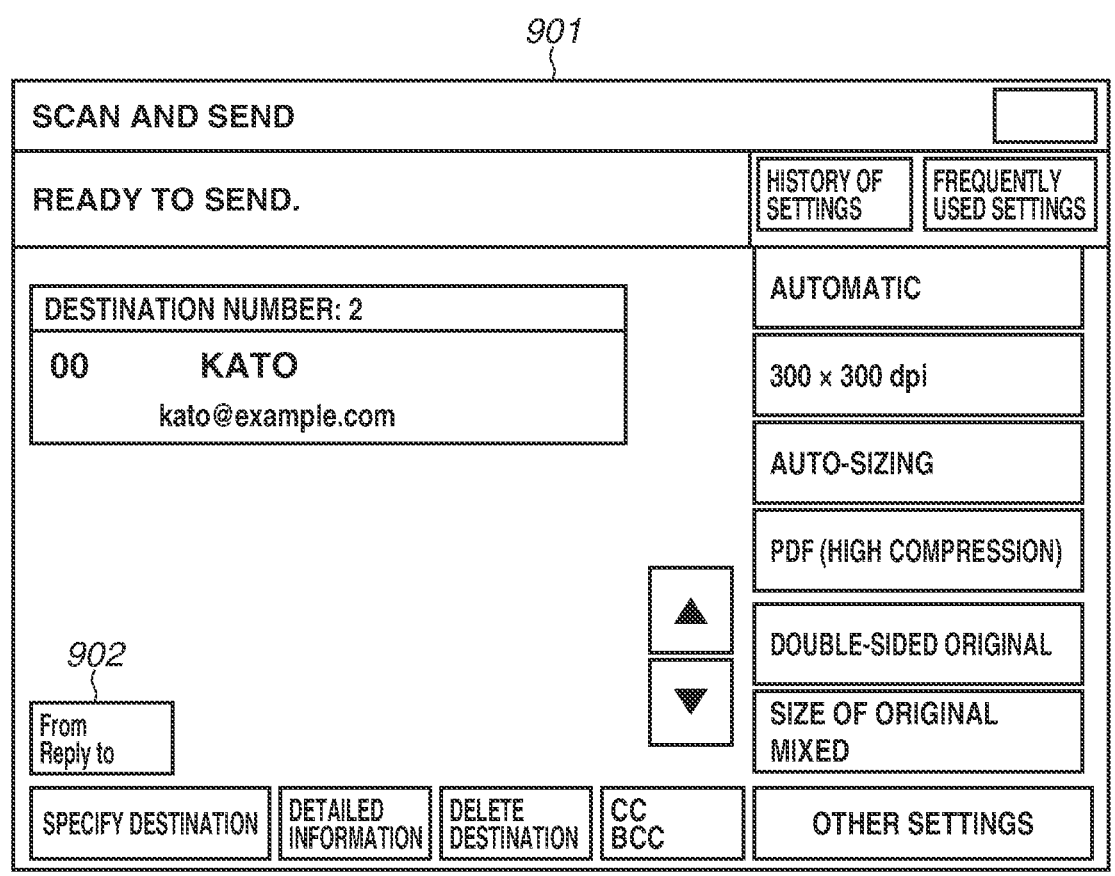
FIG. 9 is a diagram illustrating an example of an email sending screen of the image processing apparatus.

FIG. 9 is a diagram illustrating a sending screen of the image processing apparatus 104 according to the present exemplary embodiment.

A screen 901 is a screen for setting sending, and on this screen, a sending destination can be selected and scanning setting can be performed. When a button 902 illustrated as "From, Reply to" is pressed, a transition is made to a screen 1001 illustrated in FIG. 10 where an email address stored in the HDD 305 can be set as a sending source or a reply destination.

Figure 10:
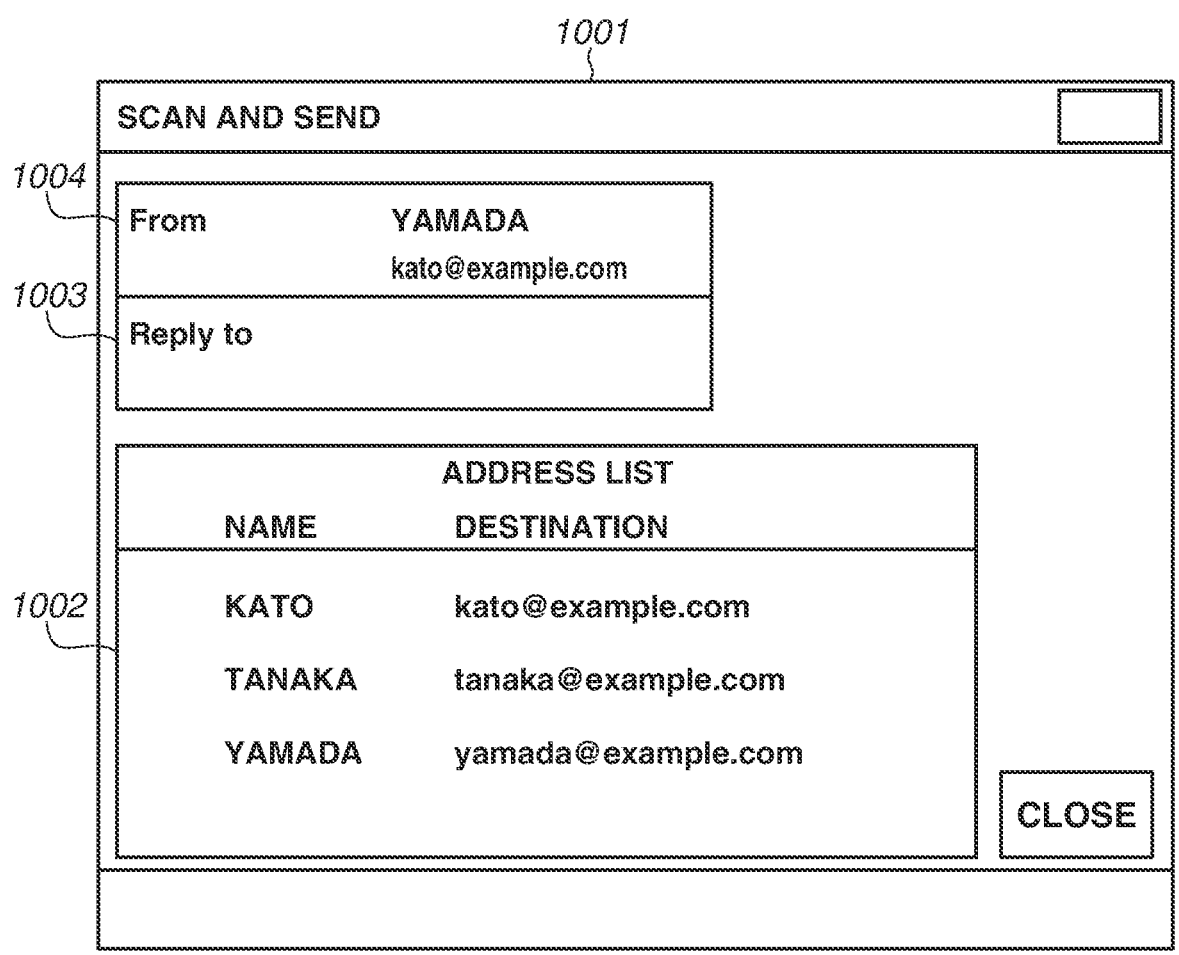
FIG. 10 is a diagram illustrating an example of a screen for setting a sending source and a reply destination in the image processing apparatus.

FIG. 10 is a diagram illustrating the screen 1001 for setting email addresses of a sending source and a reply destination. The button 902 illustrated as "From, Reply to" in FIG. 9 is pressed, and therefore a transition is made to the screen 1001.

In an address list display area 1002, email addresses stored in the HDD 305 are displayed. For example, if a user is logged in to the image processing apparatus 104, a list of email addresses registered in association with the user is displayed. A sending source input area 1004 is pressed and selected, and in this state, an arbitrary email address is selected from the address list display area 1002. Accordingly, the selected email address is reflected in the sending source input area 1004. In addition, a reply destination input area 1003 is pressed and selected, and in this state, an arbitrary email address is selected from the address list display area 1002. Accordingly, the selected email address is reflected in the reply destination input area 1003. In the sending source input are 1004 or the reply destination input area 1003, an email address of a user who is logged in to the image processing apparatus 104 (for example, an email address of a user's personal computer (PC) registered in the image processing apparatus 104 in association with user information) may be set by default. In the present exemplary embodiment, an email address is selected from the address list display area 1002. However, an email address may be input by using a hardware keyboard or a software keyboard in the sending source input area 1004 and the reply destination input area 1003. In addition, an email address may be selectable from a drop-down menu in the sending source input area 1004 and the reply destination input area 1003, instead of providing the address list display area 1002.

Figure 11:
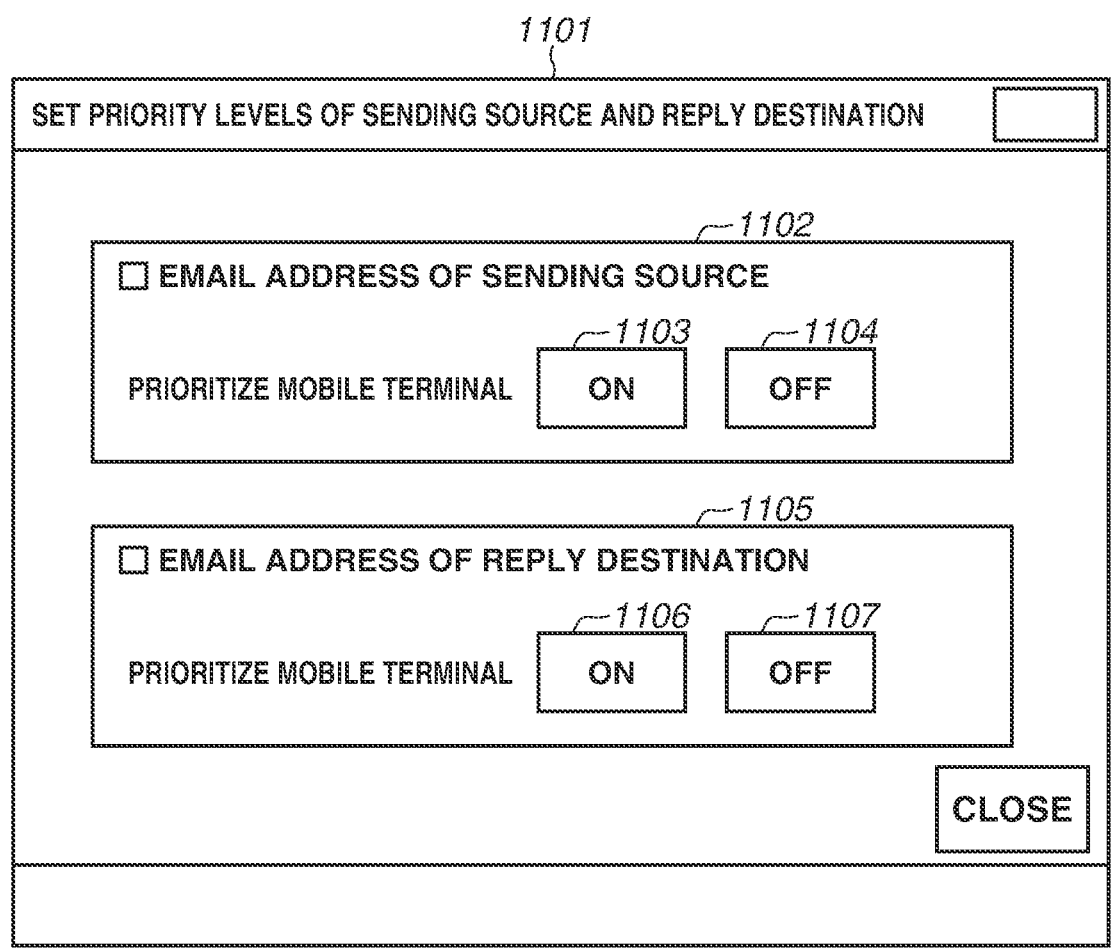
FIG. 11 is a diagram illustrating an example of a screen for setting priority levels of a sending source and a reply destination in the image processing apparatus.

FIG. 11 is a diagram illustrating a screen for setting priority levels in a case where email addresses of a sending source and a reply destination are set in both the information processing apparatus 101 and the image processing apparatus 104.

In an area 1102, a priority level of a sending source is set. In a case where an ON button 1103 in the area 1102 is pressed, setting is performed in such a way that an email address set in the information processing apparatus 101 is determined as a sending source at a higher priority level than an email address set in the image processing apparatus 104. In a case where an OFF button 1104 is pressed, setting is performed in such a way that the email address set in the image processing apparatus 104 is determined as a sending source. Similarly, in an area 1105, a priority level of a reply destination is set. In a case where an ON button 1106 in the area 1105 is pressed, setting is performed in such a way that an email address set in the information processing apparatus 101 is determined as a reply destination at a higher priority level than an email address set in the image processing apparatus 104. In a case where an OFF button 1107 is pressed, setting is performed in such a way that the email address set in the image processing apparatus 104 is determined as a reply destination.

8. Email Setting Processing Performed by Information Processing Apparatus

Figure 12:
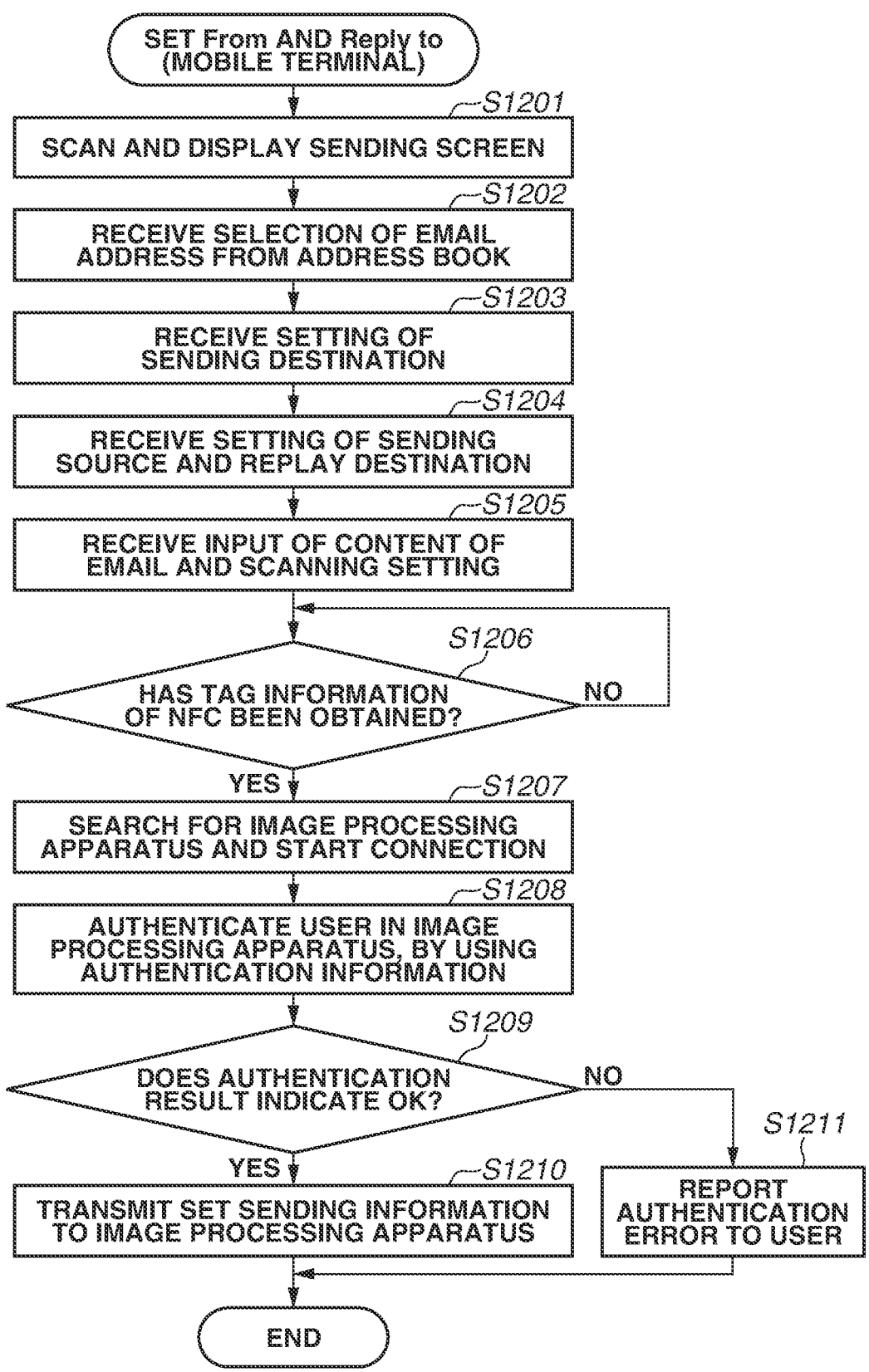
FIG. 12 is a flowchart illustrating processing of setting From and Reply to in the information processing apparatus.

Next, a processing flow of setting From and Reply to in the information processing apparatus 101 will be described with reference to the sending flowchart of FIG. 12. A processing flow will be described below under the assumption that a sending destination is selected from an address book in setting the sending destination. The sending destination may be directly input by using a software keyboard. In addition, a sending source and a reply destination may also be selectable from the address book in setting the sending source and the reply destination.

Figure 6:
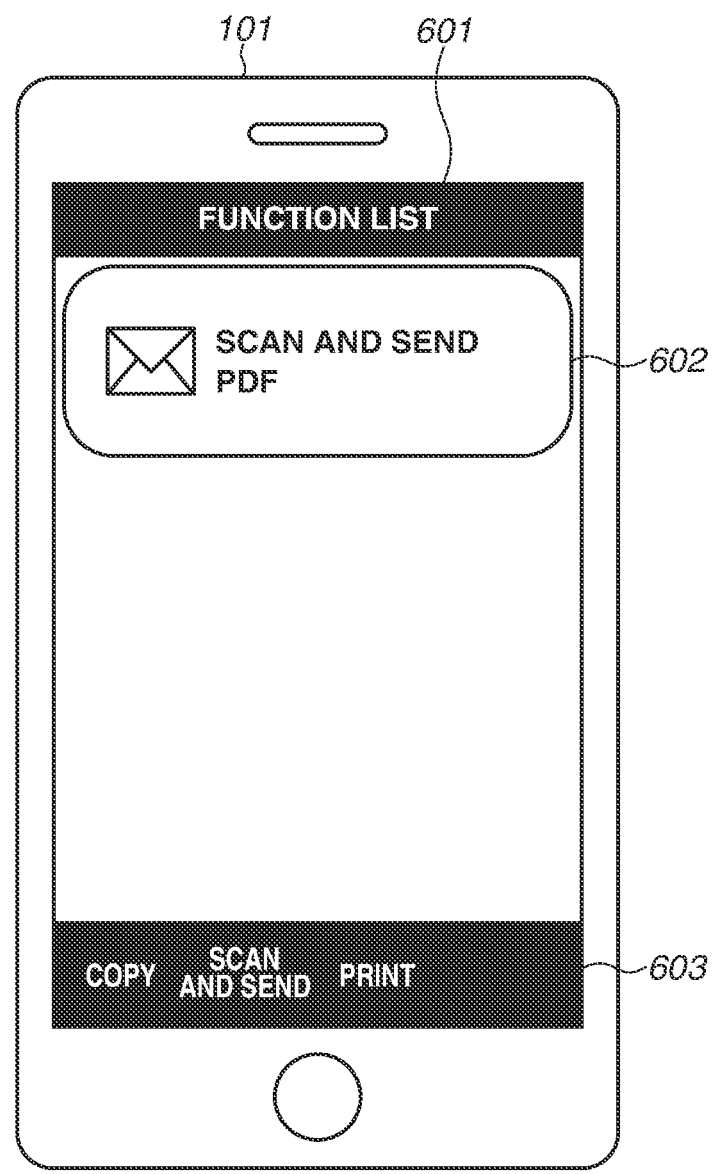
FIG. 6 is a diagram illustrating an example of a function selection screen of the information processing apparatus.

The processing flow starts when a user presses the Scan and Send button 602 on the function selection screen 601 illustrated in FIG. 6.

First, in step S1201, the Scan and Send screen 701 illustrated in FIG. 7 is displayed.

Next, in step S1202, in response to a user pressing the address book start button 704, an address book is started, and selection of an email address is received from the address book.

In step S1203, in the sending destination setting area 703, the email address selected in step S1202 is received, and To is set.

In step S1204, in the sending source setting area 705, an email address is received, and From is set. In addition, in the reply destination setting area 706, an email address is received, and Reply to is set.

In step S1205, in the scanning setting area 708, scanning setting, such as color setting or a resolution of scanning, is received. In a case where the Open button 707 is pressed, the screen 701 of FIG. 8 is displayed, and an input of the content of an email is received in input fields, the subject field 803 and the body text field 804. If the Execute button 710 is pressed, a display returns to the screen 701 of FIG. 7.

In step S1206, a user brings the information processing apparatus 101 into contact with an NFC touch area of the image processing apparatus 104, and it is detected whether tag information on NFC including connection information on the image processing apparatus 104 has been obtained.

In a case where the tag information on NFC has been obtained (YES in step S1206), the processing proceeds to step S1207. In a case where the tag information on NFC has failed to be obtained (NO in step S1206), the processing enters into a standby state. In step S1207, the image processing apparatus 104 is searched for on the basis of the connection information obtained in step S1206, and connection is started.

When connection has been established, in step S1208, a user is authenticated in the image processing apparatus 104 by using authentication information managed by the authentication setting management unit 403.

In step S1209, determination is performed on the basis of a result of user authentication that has been received from the image processing apparatus 104. In a case where a result of authentication indicates OK (YES in step S1209), the processing proceeds to step S1210.

In step S1210, sending information is transmitted to the image processing apparatus 104, and the processing is terminated. The sending information includes a list of email addresses of a sending source, a sending destination, a reply destination, scanning setting, and the content of an email.

In step S1209, in a case where a result of user authentication indicates an error (No in step S1209), an authentication error is displayed on a screen in step S1211, and the processing is terminated.

9. Email Setting Processing (1) Performed by Image Processing Apparatus

Figure 13:
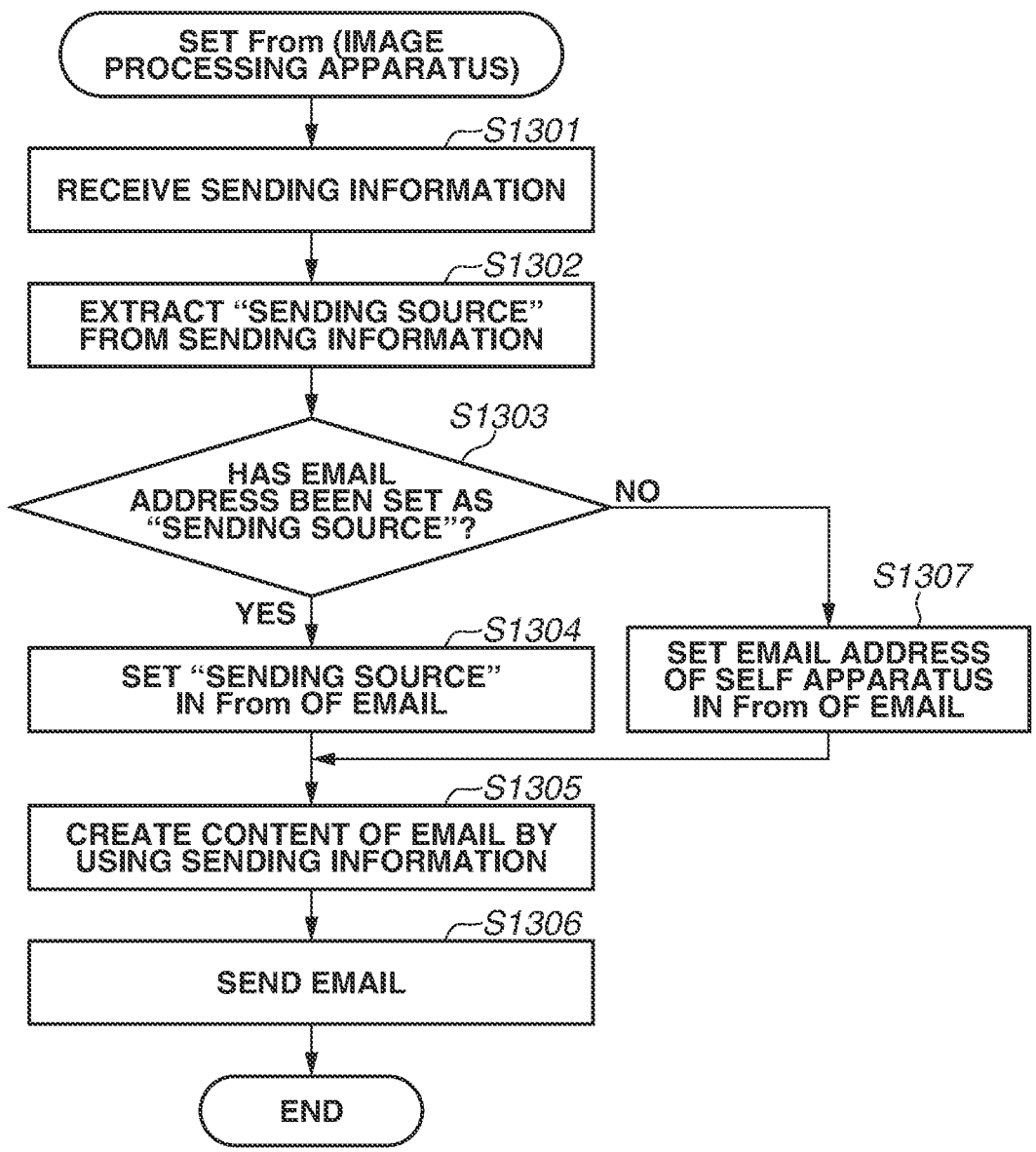
FIG. 13 is a flowchart illustrating processing of setting From in the image processing apparatus.

Next, a flow of setting a sending source in the image processing apparatus 104 will be described with reference to the From setting flowchart of FIG. 13.

In step S1301, the image processing apparatus 104 receives sending information from the information processing apparatus 101.

In step S1302, information relating to a sending source is extracted from the received sending information.

In step S1303, it is determined whether an email address is set as the sending source.

In a case where an email address is set (YES in step S1303), the processing proceeds to step S1304.

In step S1304, the email address of the sending source is reflected in From of an email, and the processing proceeds to step S1305.

In a case where an email address is not set (NO in step S1303), the processing proceeds to step S1307.

In step S1307, an email address set in the image processing apparatus 104 is reflected in From of an email, and the processing proceeds to step S1305. An email address in this case is, for example, an email address that has been registered in the image processing apparatus 104 in association with a user who has been authenticated by using authentication information transmitted from the information processing apparatus 101.

In step S1305, the content of an email is created by using the sending information.

In step S1306 that follows, an email is sent.

Figure 14:
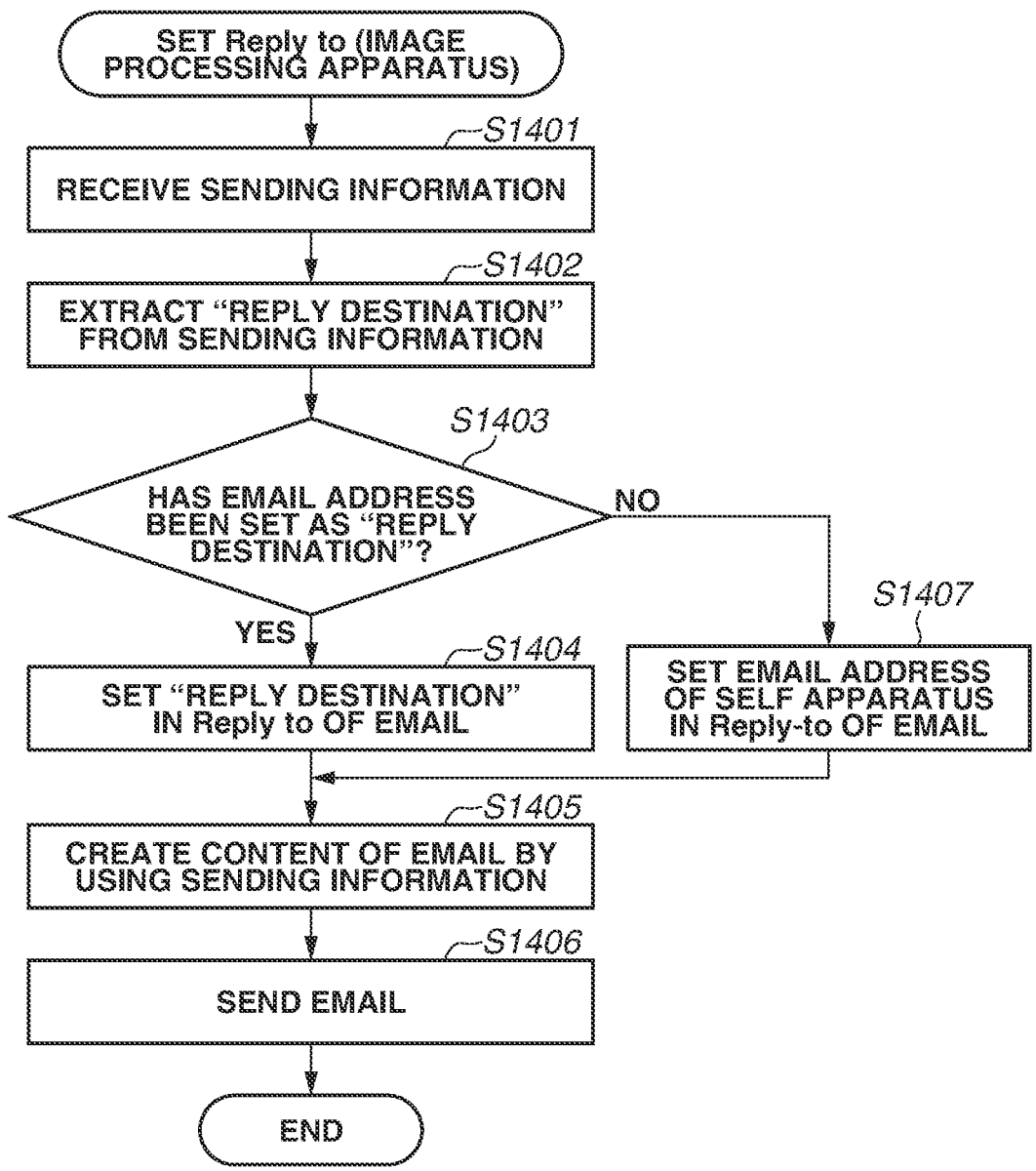
FIG. 14 is a flowchart illustrating processing of setting Reply to in the image processing apparatus.

A flow of setting a reply destination in the image processing apparatus 104 is illustrated in the Reply to setting flowchart of FIG. 14. The flow is similar to the flow described above relating to From, and therefore description is omitted. In the exemplary embodiment described above, a description relating to an email address has been provided. A setting destination of sending information may be a subject, a body text, or a file name.

In addition, in step S1307, an email address of an authenticated user may be reflected in From of an email instead of the email address set in the image processing apparatus 104.

As described above, according to the present exemplary embodiment, an email address included in sending information that has been received from an information processing apparatus can be set as a sending destination, a sending source, or a reply destination. Further, the received email address can be set as the sending destination, the sending source, or the reply destination without a user's operation performed on a panel in an image processing apparatus. This improves operability.

10. Email Setting Processing (2) Performed by Image Processing Apparatus

The first exemplary embodiment has described a method for setting an email address included in received sending information as a sending source and a reply destination. However, there is a possibility that arbitrary email addresses are set in advance as a sending source and a reply destination in an image processing apparatus. A second exemplary embodiment describes a method for determining a sending source and a reply destination on the basis of setting relating to which email addresses are to be prioritized from among arbitrary email addresses set in the image processing apparatus and email addresses included in received sending information. In the exemplary embodiment described below, it is assumed that arbitrary email addresses are set in advance as a sending source and a reply destination in an image processing apparatus.

Figure 15:
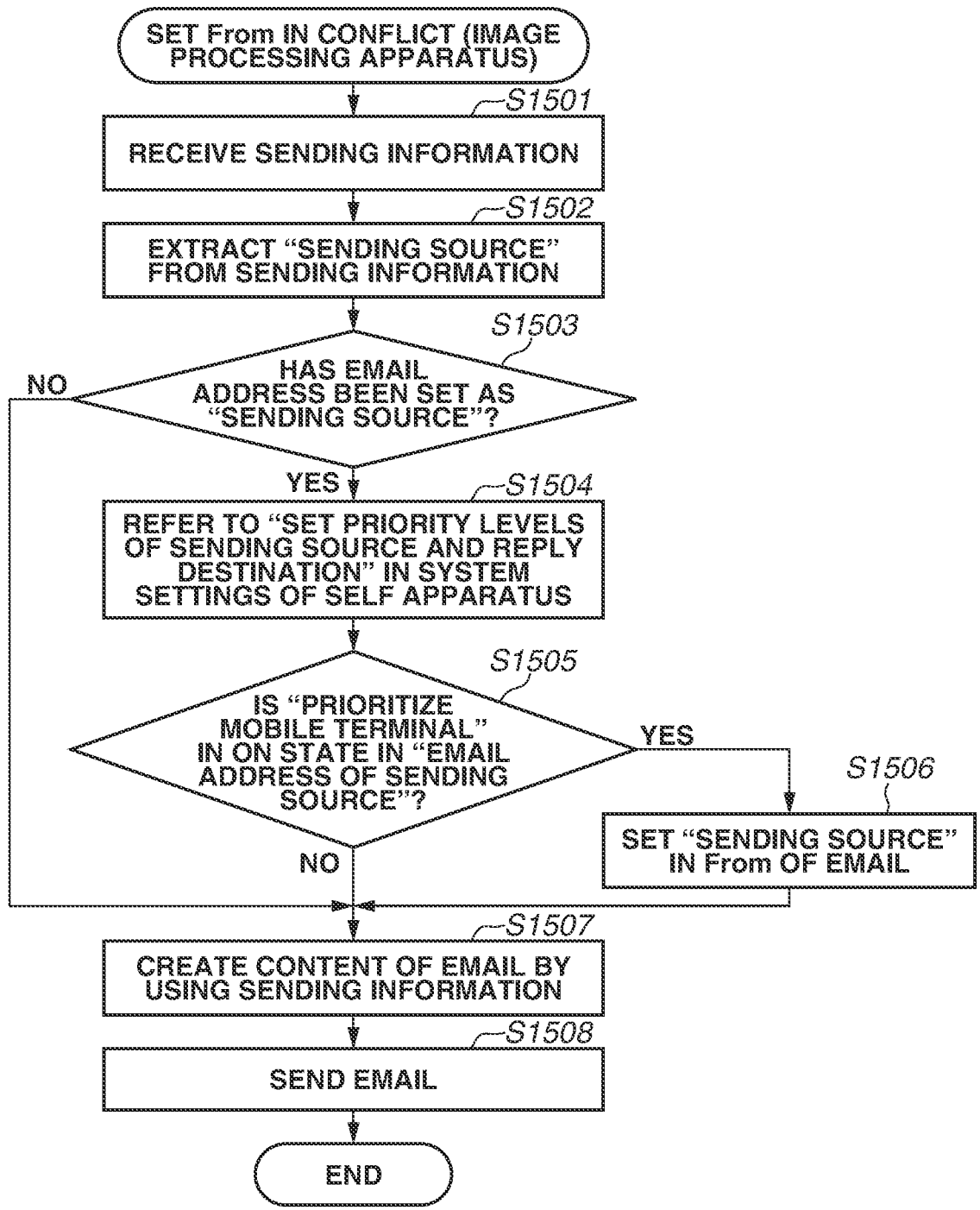
FIG. 15 is a flowchart illustrating processing of setting From in conflict in the image processing apparatus.

A flow of setting From in a case where a sending source set in the image processing apparatus 104 conflicts with a sending source received from the information processing apparatus 101 will be described with reference to the flowchart of FIG. 15.

In step S1501, sending information is received from the information processing apparatus 101.

In step S1502, information relating to a sending source is extracted from the received sending information.

In step S1503, it is determined whether an email address is set as the sending source. In a case where an email address is set as the sending source (YES in step S1503), the processing proceeds to step S1504.

In a case where an email address is not set (NO in step S1503), the processing proceeds to step S1507.

In a case where an email address is not set as the sending source (NO in step S1503), an email address set in the image processing apparatus 104 is reflected in From of an email, and the processing proceeds to step S1507.

In step S1504, "priority level setting" managed by the job setting management unit 506 is referred to.

In step S1505, it is determined whether "prioritize mobile terminal" is in an ON state in "priority level setting".

In a case where "prioritize mobile terminal" is in the ON state (YES in step S1505), the processing proceeds to step S1506.

In a case where "prioritize mobile terminal" is not in the ON state (NO in step S1505), the email address set in the image processing apparatus 104 is reflected in From of an email, and the processing proceeds to step S1507.

In step S1506, the email address of the sending source is reflected in From of an email, and the processing proceeds to step S1507.

In step S1507, the content of the email is created by using reflected setting relating to From.

In step S1508, the email is sent.

Figure 16:
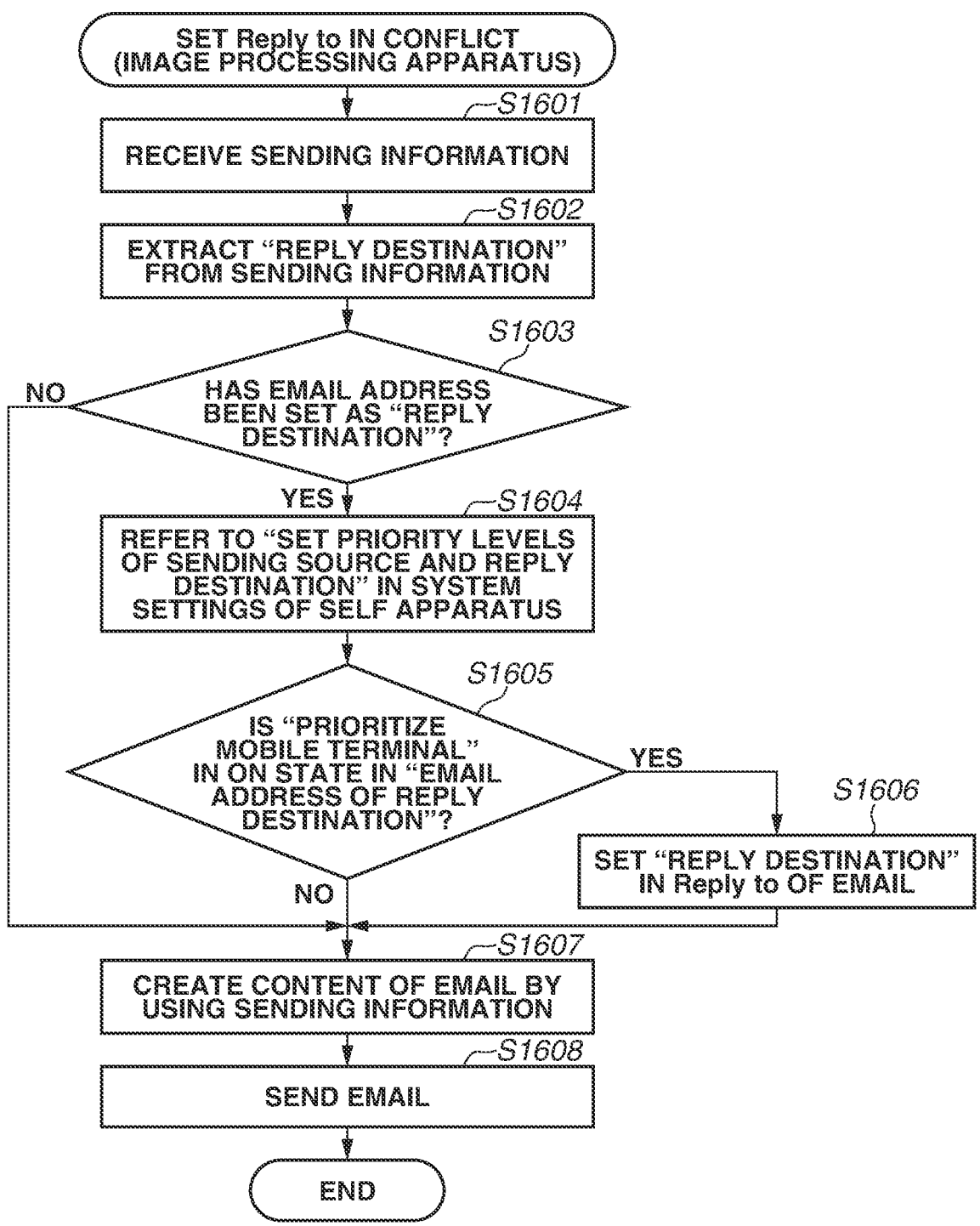
FIG. 16 is a flowchart illustrating processing of setting Reply to in conflict in the image processing apparatus.

The flowchart of FIG. 16 illustrates a flow of setting Reply to in a case where a reply destination set in the image processing apparatus 104 conflicts with a reply destination received from the information processing apparatus 101. The flow is similar to the flow described above relating to From, and therefore description is omitted.

As described above, according to the present exemplary embodiment, in a case where email addresses are set as a sending source and a reply destination in an image processing apparatus and received sending information, email addresses to be prioritized can be determined.

Other Exemplary Embodiments

Embodiments of the present disclosure can also be implemented in processing in which a program implementing one or more functions in the exemplary embodiments described above is provided to a system or an apparatus via a network or a storage medium, and one or more processors in a computer of the system or the apparatus read and execute the program. In addition, embodiments of the present disclosure can also be implemented by using a circuit (for example, an application specific integrated circuit (ASIC)) that implements the one or more functions.

According to an exemplary embodiment of the present disclosure, when an image processing apparatus receives sending information from a mobile terminal, an email address set by the mobile terminal is reflected in a sending source. In this way, a receiver of an email can easily identify a sender of the email. Similarly, an email address set by the mobile terminal is reflected in a reply destination. This can avoid a possibility that a receiver of an email will make a reply at a wrong email address, and can save time and effort of the receiver for setting a reply destination.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-212150, filed Dec. 22, 2020, which is hereby incorporated by reference herein in its entirety.

What is claimed is:

1. An image processing apparatus that is connected to an information processing apparatus via a network, the image processing apparatus comprising:
   at least one processor and at least one memory coupled to the at least one processor and storing instructions, which when executed by the at least one processor, cause the at least one processor and the at least one memory to act as:
   a reception unit configured to receive sending information and job information from the information processing apparatus, the sending information including at least any of a sending source and a reply destination of an email set by a user in the information processing apparatus, the job information relating to sending of the email using the sending information;
   an acquisition unit configured to acquire the sending information including at least any of the sending source and the reply destination of an email based on an input by the user on a first screen on a display unit of the image processing apparatus;
   an acceptance unit configured to accept a setting of a priority level of the sending information to be used, either the sending information set in the information processing apparatus and received by the reception unit or the sending information acquired by the acquisition unit, based on a selection by the user on a second screen on the display unit; and
   a sending unit configured to create and send the email in accordance with the job information, the at least any of the sending source and the reply destination included in the sending information received by the reception unit or the at least any of the sending source and the reply destination included in the sending information acquired by the acquisition unit being set in the email based on the setting of the priority level.

2. The image processing apparatus according to claim 1, wherein the instructions, when executed by the at least one processor, further cause the at least one processor and the at least one memory to act as an authentication unit,
   wherein the reception unit receives a job of an authenticated user.

3. The image processing apparatus according to claim 1, wherein the priority level is set for each piece of the sending information.

4. The image processing apparatus according to claim 1, wherein an email address of an authenticated user is determined as a sending source of the sending information set in the image processing apparatus.

5. A system comprising:
   an information processing apparatus; and
   an image processing apparatus,
   wherein the information processing apparatus includes:
   at least one processor and at least one memory coupled to the at least one processor and storing instructions, which when executed by the at least one processor, cause the information processing apparatus to:
      set any of a sending source and a reply destination of an email sent from the image processing apparatus based on a user's instruction; and
      send sending information and job information to the image processing apparatus, the sending information including at least any of the set sending source and the set reply destination of an email to be sent from the image processing apparatus, the job information indicating an instruction for the image processing apparatus to send the email using the sending information, and
   wherein the image processing apparatus includes:
   at least one processor and at least one memory coupled to the at least one processor and storing instructions, which when executed by the at least one processor, cause the image processing apparatus to:
      receive the sending information and a job from the information processing apparatus, the sending information including at least any of the sending source and the reply destination of the email set by the user in the information processing apparatus, the job relating to sending of the email using the sending information;
      acquire the sending information including at least any of the sending source and the reply destination of an email based on an input by the user on a first screen on a display of the image processing apparatus;
      accept a setting of a priority level of the sending information to be used, either the sending information set in the information processing apparatus and received or the sending information acquired, based on a selection by the user on a second screen on the display; and
      create and send the email in accordance with the job information, the at least any of the sending source and the reply destination included in the sending information received or the at least any of the sending source and the reply destination included in the sending information acquired being set in the email based on the setting of the priority level.

6. A method for controlling an image processing apparatus that is connected to an information processing apparatus via a network, the method comprising:
- receiving sending information and a job from the information processing apparatus, the sending information including at least any of a sending source and a reply destination of an email set by a user in the information processing apparatus, the job relating to sending of the email using the sending information;
- acquiring the sending information including at least any of the sending source and the reply destination of an email based on an input by the user on a first screen on a display of the image processing apparatus;
- accepting a setting of a priority level of the sending information to be used, either the sending information set in the information processing apparatus and received in the receiving or the sending information acquired in the acquiring, based on a selection by the user on a second screen on the display; and
- creating and sending the email in accordance with the job, the at least any of the sending source and the reply destination included in the sending information received or the at least any of the sending source and the reply destination included in the sending information acquired being set in the email based on the setting of the priority level.

* * * * *